(No Model.) 3 Sheets—Sheet 1.
J. A. ENOS.
ELECTRIC SURFACE RAILWAY.

No. 379,509. Patented Mar. 13, 1888.

(No Model.) 3 Sheets—Sheet 2.

J. A. ENOS.
ELECTRIC SURFACE RAILWAY.

No. 379,509. Patented Mar. 13, 1888.

WITNESSES:
Fred G. Dieterich
Edw. H. Byrn

INVENTOR:
John A. Enos
BY Munn & Co
ATTORNEYS.

(No Model.) 3 Sheets—Sheet 3.

J. A. ENOS.
ELECTRIC SURFACE RAILWAY.

No. 379,509. Patented Mar. 13, 1888.

WITNESSES:
Fred G. Dieterich.
Edw. W. Byrn.

INVENTOR:
John A. Enos.
BY Munn & Co
ATTORNEYS.

UNITED STATES PATENT OFFICE.

JOHN A. ENOS, OF BOSTON, ASSIGNOR TO HIMSELF, WILLIAM C. OTIS, OF NAHANT, E. HERBERT INGALLS AND PAUL WEST, BOTH OF BROOKLINE, AND WILLIAM E. PLUMMER, OF NEWTON, MASSACHUSETTS.

ELECTRIC SURFACE RAILWAY.

SPECIFICATION forming part of Letters Patent No. 379,509, dated March 13, 1888.

Application filed April 15, 1887. Serial No. 234,964. (No model.)

*To all whom it may concern:*

Be it known that I, JOHN A. ENOS, of Boston, in the county of Suffolk and State of Massachusetts, have invented a new and useful improvement in Electric Surface Railways, of which the following is a specification.

My invention relates to that form of electric railway in which an electric motor is carried on the car and drives its wheels, which motor is actuated by secondary or storage batteries carried on the car, and which storage-batteries are charged from time to time along the line by having their terminals brought into temporary contact with conductors along the line, which conductors are supplied with a current from a dynamo or other generator.

My invention consists in the peculiar construction and arrangement of parts, which I will first fully describe, and then point out in the claims, the said improvements having reference more particularly to the connections for taking the current from the conductors along the line for charging the storage-batteries, and also to the driving mechanism for propelling the car.

Figure 1:
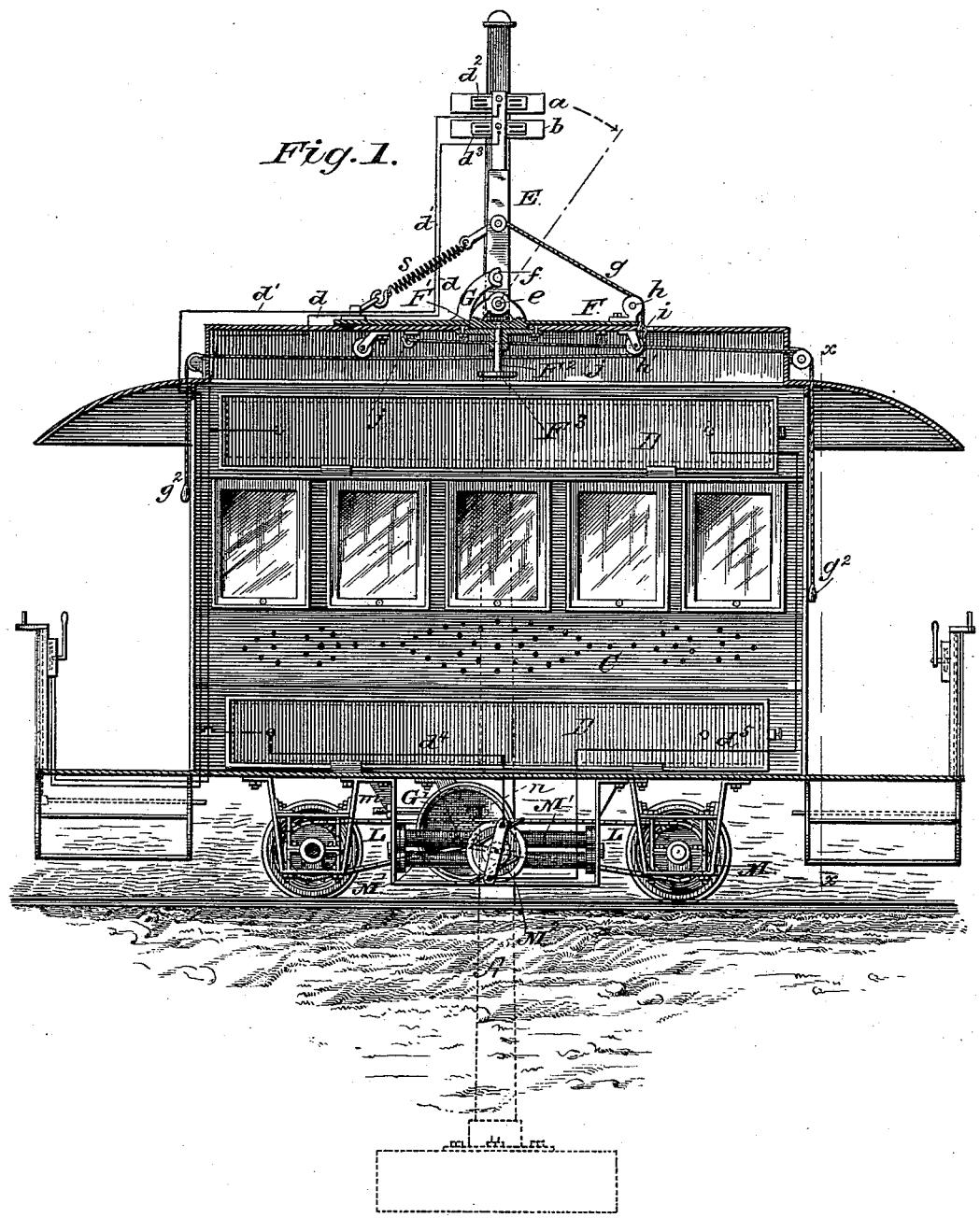
Figure 2:
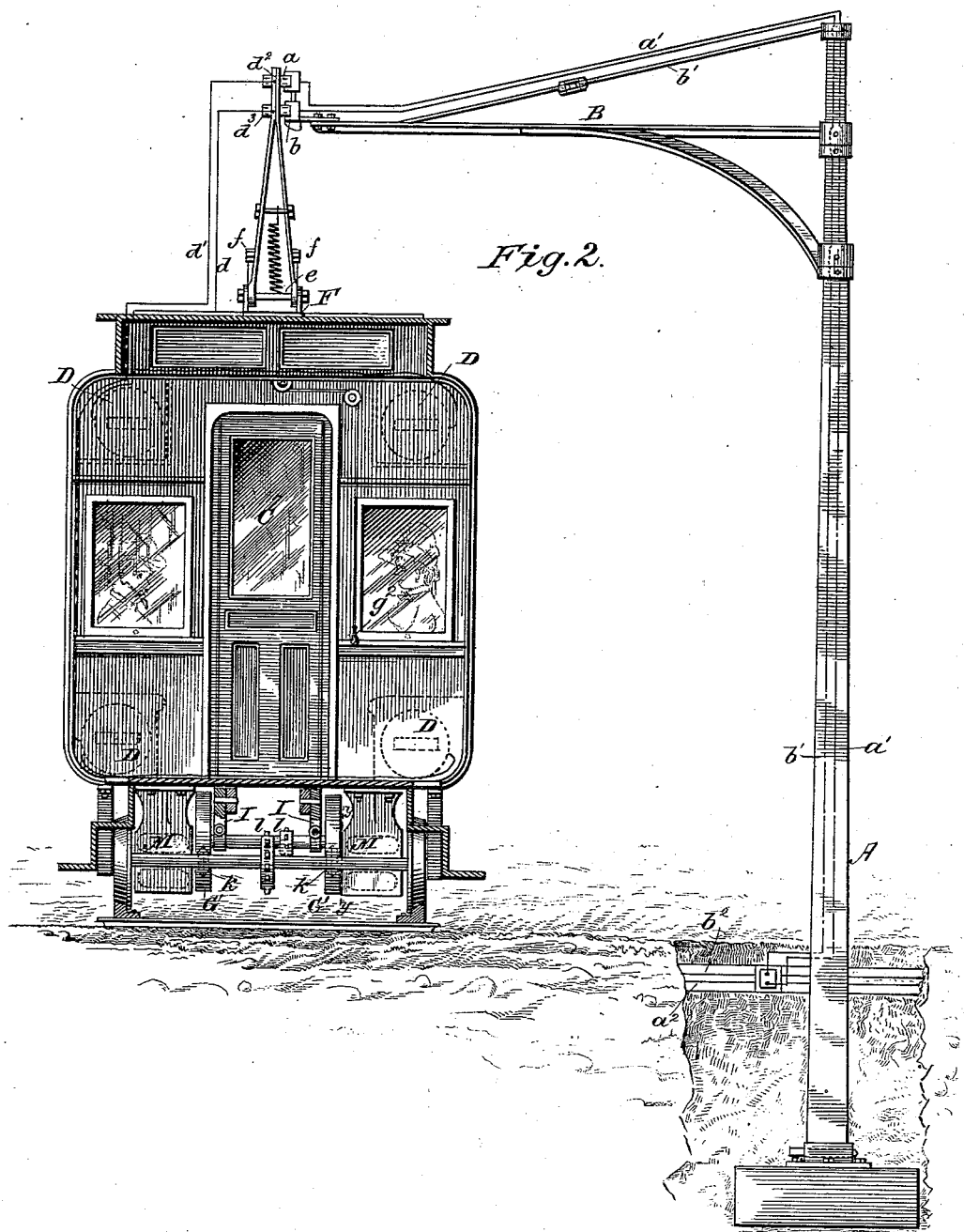
Figure 3:
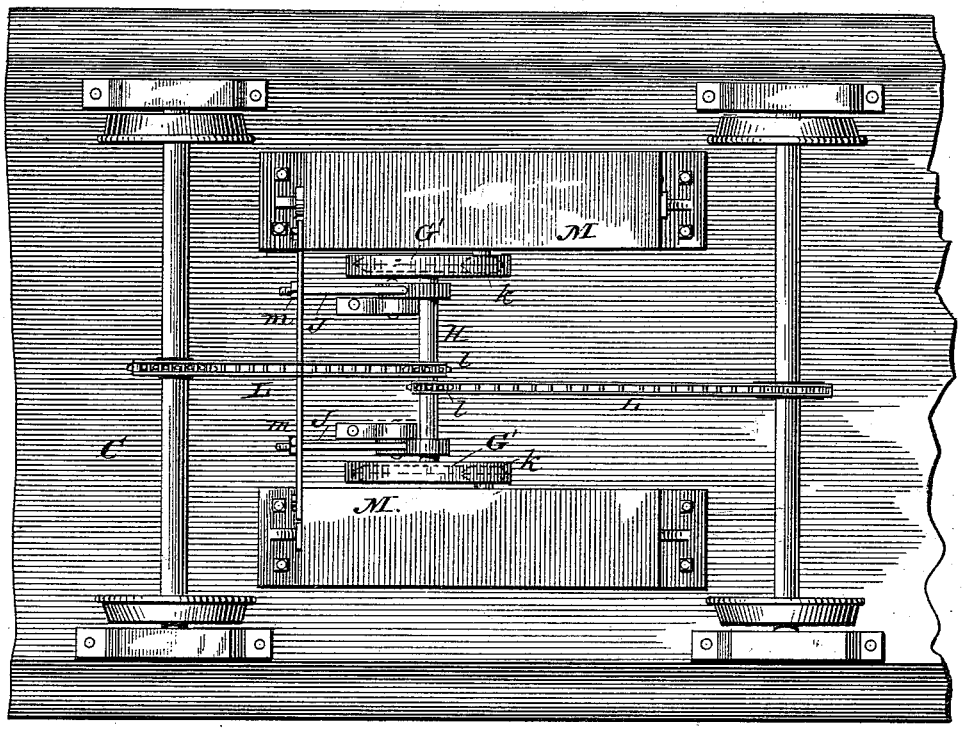
Figure 4:
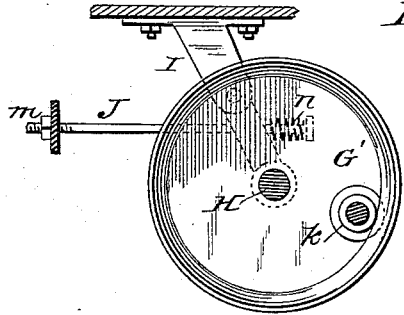

Figure 1 is a side elevation, partly in section, of the car and the overhanging conductors. Fig. 2 is an end elevation of the car, partly in section, through the line $x\ x$ of Fig. 1, also showing the standard and overhanging arm of the conductor-supports. Fig. 3 is an inverted plan view of the car, and Fig. 4 is a sectional detail through the line $y\ y$ of Fig. 2.

A are standards anchored firmly in the ground upon a suitable base at intervals along the line of the railway, which intervals represent the points of recharging the storage-batteries. Each standard is provided with a strongly-braced overhanging horizontal arm, B, which at its outer end carries two metal contact-surfaces, $a\ b$, suitably insulated from each other. These contact-surfaces are respectively connected to the circuit-wires $a'\ b'$, which extend along the arm and down the standard to the two main conductors $a^2\ b^2$, which run underground along the line of the railway and are connected to the opposite poles of a dynamo or other generator of electricity.

C is the car, in which, in the waste spaces of the top and also under the seats of which, are disposed storage-batteries D D D D. These storage-batteries are charged through wires $d$ $d'$, which lead to brushes $d^2\ d^3$, carried by a frame-work on the top of the car, which brushes at suitable intervals strike the metallic contacts $a\ b$ and receive the current from the main source of supply. These secondary batteries in the intervals between the standards give off their supply to the electric motors of the car through conducting-wires $d^4\ d^5$, and serve to propel the car by mechanism connecting with the wheels, as will be hereinafter described.

On the top of the car is mounted an adjustable frame, E, which carries at its upper end the brushes $d^2\ d^3$. This frame normally occupies a vertical position, so that the brushes may strike the conducting contact-plates, but is adjustable about a pivotal bolt, $e$, so that said frame may be deflected and turned down into a horizontal position, as is frequently necessary in populous cities, to escape bridges and overhead structures. This frame is pivoted by bolt $e$ in the ears of a horizontal turn-plate, F, which bears upon a subjacent collar, F', fastened to the top of the car, and is kept in place thereon by a vertical shaft, $F^2$, which is rigidly attached to the turn-plate and extends through an elongated central hole or bearing in the collar. This shaft has at its lower end, inside the car, a hand-wheel, $F^3$, by means of which the turn-plate F is reversed to cause the brushes to face the opposite way when the car is on the return trip on the other side of the double track. To hold the frame E in upright position, a bracket, G, is formed on the turn-plate, and has seats to receive the trunnion projections $f$ on the frame, and said frame is held up with its trunnions against the abutment which this bracket affords by means of the tension of a spiral spring, S. To draw the frame E down and out of the way when passing under a bridge or overhead structure a cord, $g$, is fastened to the frame E on the opposite side from the spring, and said cord passes over a pulley, $h$, on the end of the turn-plate, through a hole in the top of the car, and over pulley $h'$ on the inside of the car-roof, and, extending to the end of the car, passes on the outside over pulleys, down to a position within reach of the conductor, and terminates in a handle, $g^2$. By pulling on this cord it will be seen that the frame E is turned down into a horizontal position, and as the turn-plate is reversed at the end of the route these cords and pulleys on the car are duplicated at each end, and a snap-connection or clasp, $i$, serves to connect the cord above the car with the cord in the car. When the frame E is to be reversed, this snap-connection or clasp is opened and the detached cord within the car is hung up on one of the hooks $j$, and the other cord at the opposite end is, after the plate is turned, connected to the cord above the top of the car.

The motor is a double one, each being contained within bracket-frames M M, Fig. 2, bolted to the under side of the car, and each having a set of field-magnets, M', Fig. 1, and revolving armatures M², with brushes connected with circuit-wires $d^4$ $d^5$. These revolving armatures have upon the extended ends of their shafts small friction-wheels $k$, of V-shaped peripheries, which engage with V-shaped grooves on the inner peripheries of cylindrical shells G' G'. These shells are rigidly mounted upon the outer ends of a short counter-shaft, H, journaled in swinging bars I I, which latter are pivoted or jointed to projections from the bottom of the car. On this counter shaft are two small chain-wheels, $l$ $l$, which are respectively connected to chain-wheels L L on the two axles of the car. It will therefore be seen that when the armatures of the motor rotate their V-shaped friction-wheels engage the shells G' and rotate these, and these in turn, by rotating the counter-shaft and chain-wheels, drive the chains and rotate the car-wheels, thus propelling the car.

In order to take up any looseness or lost motion due to wear between the friction-wheels and the shells, the latter, with their shaft, have a slight adjustment in the swinging bars I; and to hold said shells tightly engaged with the friction-wheels each bar I has a rod, J, passing through it and extending through the bracket-frame M, and on the outside of said frame said rod is screw-threaded and provided with a nut, $m$, by tightening which the shells are drawn to close engagement with the friction-wheels. To render this pressure elastic, springs $n$ are interposed between the head of each rod and the bar I, or between the nut and the frame, or said spring may be placed somewhere in the length of the rod.

In making use of my invention I do not confine myself to any particular form of secondary battery, nor to the exact location and arrangement of those shown, as these are immaterial and may be varied to suit the selection of the engineer.

Having thus described my invention, what I claim as new is—

1. An electric-railway car having a frame mounted upon a horizontal axis and carrying brushes or current-receivers, a spring for holding said frame upright, an abutment for stopping said frame in upright position, and a cord and pulleys for turning the frame against the tension of the spring, substantially as shown and described.

2. In an electric-railway car, the combination of a hinged frame carrying the brushes or current-receivers and projecting above the car, a turn-plate for reversing the same, a cord for deflecting the frame, and independent pull-cords and pulleys arranged at opposite ends of the car for connection with the hinged frame when turned to either position, substantially as shown and described.

3. The combination, with the car-axles having chain-wheels thereon with chains, of a counter-shaft located between them and having chain-wheels and friction-shells at the ends, hangers forming journals for the counter-shaft, and the electric motors having friction-wheels on their armature-axes engaging with the inner periphery of the shells, substantially as shown and described.

4. The combination, with the car-axles having chain-wheels thereon with chains, of a counter-shaft located between them and having chain-wheels and friction-shells at the ends, swinging hangers forming journals for the counter shaft, the motor-shaft with friction-wheels, and tension-rods for holding the shells engaged with the friction-wheels, substantially as and for the purpose described.

JOHN A. ENOS.

Witnesses:
SOLON C. KEMON,
CHAS. A. PETTIT.